United States Patent [19]

Helou et al.

[11] Patent Number: 5,012,465
[45] Date of Patent: Apr. 30, 1991

[54] INTERCONNECTION SYSTEM FOR INTERCONNECTING CONNECTION UNITS AND A CENTRAL SWITCHING FACILITY

[75] Inventors: Didier Helou, Saint Cyr L'Ecole; Jean-Yves Peron, Lannion; René Coutin, Guingamp; Georges Thiebaut, Perros Guirec, all of France

[73] Assignee: Alcatel Cit, Paris, France

[21] Appl. No.: 473,755

[22] Filed: Feb. 2, 1990

[30] Foreign Application Priority Data

Feb. 2, 1989 [FR] France .................... 89 01348

[51] Int. Cl.⁵ .................... H04Q 11/04; H04J 3/00
[52] U.S. Cl. .................... 370/58.1; 370/58.2; 370/66; 370/77; 370/82
[58] Field of Search .................... 370/66, 67, 68, 68.1, 370/58.1, 58.2, 58.3, 59, 60, 61, 63, 77, 79, 80, 82, 83, 94.1, 110.1; 371/37.7, 48, 49.1

[56] References Cited

U.S. PATENT DOCUMENTS

| | | | |
|---|---|---|---|
| 4,197,523 | 4/1980 | Philip et al. | 370/59 |
| 4,213,201 | 7/1980 | Gagnier et al. | 370/66 |
| 4,232,386 | 11/1980 | McDonald et al. | 370/68 |
| 4,688,211 | 8/1987 | Van Simaeys et al. | 370/67 |

FOREIGN PATENT DOCUMENTS 0111406 6/1984 European Pat. Off. .

OTHER PUBLICATIONS

Systems Technology, No. 32, Sep. 1979, pp. 5-19, Liverpool, GB; A. S. Philip: "The system X digital switching subsystem (DSS)".
POEEJ, vol. 73, Apr. 1980, pp. 19-26, Londres, GB; J. N. A. Risbridger: "System X: Subsystems; Part 1-The digital switching subsystem".
Ericsson Review, vol. 55, No. 4, 1978, pp. 140-149, Stockholm, Sweden; B. Ericson et al.: "Digital group selector in the AXE 10 system".

Primary Examiner—Douglas W. Olms
Assistant Examiner—Alpus H. Hsu
Attorney, Agent, or Firm—Sughrue, Mion, Zinn, Macpeak & Seas

[57] ABSTRACT

A central switching facility is constituted by two switching networks connected to each of the connection units via two connection circuits. A connection circuit selects on a timeslot-by-timeslot basis which output network link is to be used for conveying each time slot to the connection unit. On an instruction from the switching network, a connection circuit operates, in a message mode, on one of the time slots selected from those which it processes, and it sends monitoring information to the switching network via control bits in that time slot. An instruction bit, selecting a message mode or a normal mode, is included in each frame transmitted from the switching network to a connection circuit.

3 Claims, 4 Drawing Sheets

INTERCONNECTION SYSTEM FOR INTERCONNECTING CONNECTION UNITS AND A CENTRAL SWITCHING FACILITY

The invention applies to telecommunications and relates to connecting a central switching facility with the various connection units in a telecommunications exchange.

BACKGROUND OF THE INVENTION

In general, the central switching facility performs the following functions:

- establishing a one-way connection between an arbitrary input time slot in an arbitrary input multiplex link and an arbitrary output time slot in an arbitrary output multiplex link;
- establishing a connection between an arbitrary input time slot and M arbitrary output time slots; and
- establishing a connection between N time slots in the same frame of an arbitrary input multiplex link and N time slots in the same frame of an arbitrary output multiplex link while leaving unaltered the integrity and the sequencing of the received frame.

A two-way connection between an end A (calling party) and an end B (called party) is constituted in the form of two oneway connections.

Thus, the central switching facility also provides the following functions:

- switching between a connection unit referred to as "auxiliary equipment" and speech time slots for audio frequency signalling;
- broadcasting tones and recorded announcements over a plurality of output time slots simultaneously; and
- establishing permanent switching between time slots in a multiplex link transmitting data or semaphore signalling information between one circuit and another or between a circuit and a semaphore station.

In order to ensure secure operation, the switching facility comprises two identical switching networks.

In addition, transmission quality must comply with CCITT recommendations Q503 to Q513.

The object of the invention is to monitor transmission on a continuous basis for each connection.

Another object of the invention is to check on connections as established.

A further object of the invention is to detect faults.

SUMMARY OF THE INVENTION

The present invention provides an interconnection system for interconnecting connection units and a central switching facility, said central switching facility being duplicated and constituted by two switching networks which are connected by a link to control members, each connection unit being connected to both switching networks via a selector circuit comprising two connection circuits, each connection circuit being connected by an access link to the connection unit and by a network link to one of the switching networks, said network and access links being two-way multiplex links having frames of fixed length, wherein each frame comprises 16-bit time slots providing 8 data bits, 5 transparent bits, and 3 check bits, a first one of the check bits being a connection circuit operation mode bit having a value 0 for a normal operation mode and a value 1 for a message operation mode, with the second and third check bits having respective different meanings as a function of the value of the first check bit, the value of the first check bit being fixed by the switching network in each time slot that it transmits towards a connection circuit, and a message being constituted in message mode by a multiframe of order thirty-two, said first check bit having the value 1 for only one time slot out of the time slots transmitted by the switching network to a connection circuit, and likewise for one time slot out of the time slot delivered by the connection circuit to the switching network, the value 1 being maintained for thirty-one frames and replaced by the value 0 during the thirty-second frame of a multiframe, the said message being conveyed by the second check bit, and the third check bit conveying a cyclic redundancy check of order thirty-two calculated over all of the bits conveyed by the frames of the multiframe.

BRIEF DESCRIPTION OF THE DRAWINGS

An embodiment of the invention is described by way of example with reference to the accompanying drawings, in which.

DETAILED DESCRIPTION

Figure 1:
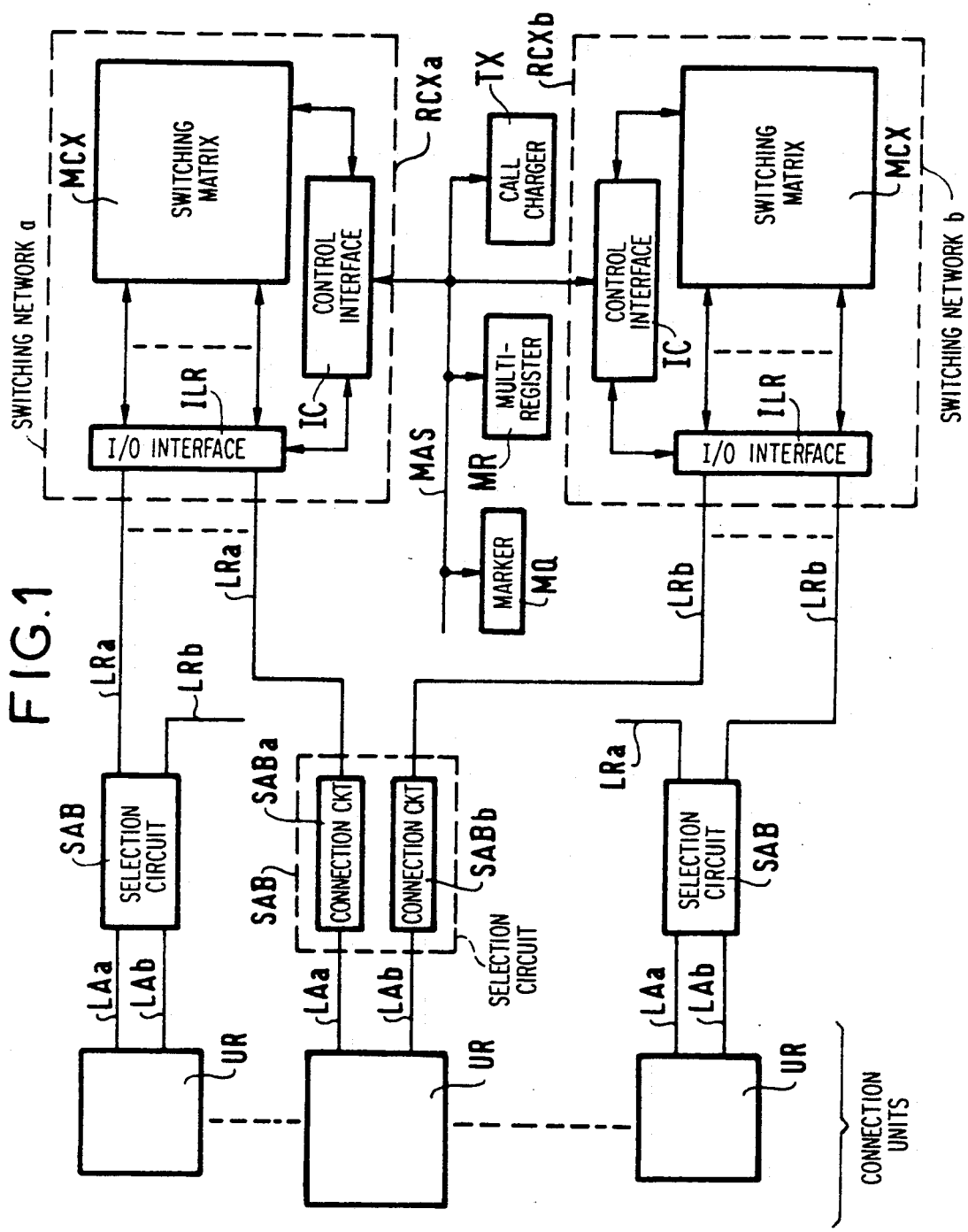
FIG. 1 is a block diagram of a telecommunications exchange including an interconnection system of the invention.

FIG. 1 is a block diagram of a telecommunications exchange comprising two switching networks RCXa and RCXb, and connection units UR each connected to both switching networks via respective selector circuits SAB. The switching networks are connected via a common link MAS to control units including a marker MQ, a multiregister MR, and a call-charging circuit TX. Each switching network comprises a switching matrix MCX, an input/output interface ILR connected to the switching matrix and to the selector circuits SAB, and a control interface IC which is connected to the switching matrix MCX, to the input/output interface ILR, and to the link MAS.

Each selector circuit SAB is constituted by two connection circuits SABa and SABb. Connection circuit SABa is connected to one of the connection units UR via a two-way access link LAa and to the input/output interface ILR of switching network RCXa via a two-way network link LRa. Connection circuit SABb is connected to said connection unit UR via a two-way access link LAb, and to the input/output interface ILR of the switching network RCXb via a two-way network link LRb.

Each of the two-way links LAa, LAb, LRa, and LRb is constituted by a one-way multiplex line for each transmission direction, with each multiple line having a 32 time slot frame.

As explained below, each time slot in a frame comprises 16 bits, made up of 8 bits for the base channel at 64 Kbit/s, and 8 additional bits, 3 of which are used for permanent transmission monitoring purposes, and the other 5 of which are available for utilization in other ways.

The 8 basic channel bits and the 5 unused additional bits are switched transparently. The permanent monitoring is based on permanently comparing information present on both switching networks for each call direction.

The selector circuits SAB and the switching networks RCXa and RCXb constitute a switching facility whose structure is duplicated using two identical branches, a first branch being constituted by the connection circuits SABa and the switching network RCXa, and the second branch being constituted by the connection circuits SABb and the switching network RCXb. The connections are established simultaneously in both branches and the duplication is effective all the way to the connection units UR. In this manner, established calls are maintained in the event of disturbance on one of the branches, and traffic is not degraded by one of the elements of a branch or the entire branch being out of service. The selector circuits SAB are disposed in the immediate proximity of the connection units UR, or they may even be disposed within said connection units. Each connection circuit SABa and SABb includes a transmit amplifier and a receive amplifier on its switching network side, thereby enabling the connection units UR to be situated at a considerable distance from the switching networks, e.g. 50 meters for conventional 4 Mbit/s links LRa and LRb, and about 300 meters when these links are fiber optic links operating at 34 Mbit/s.

Figure 2:
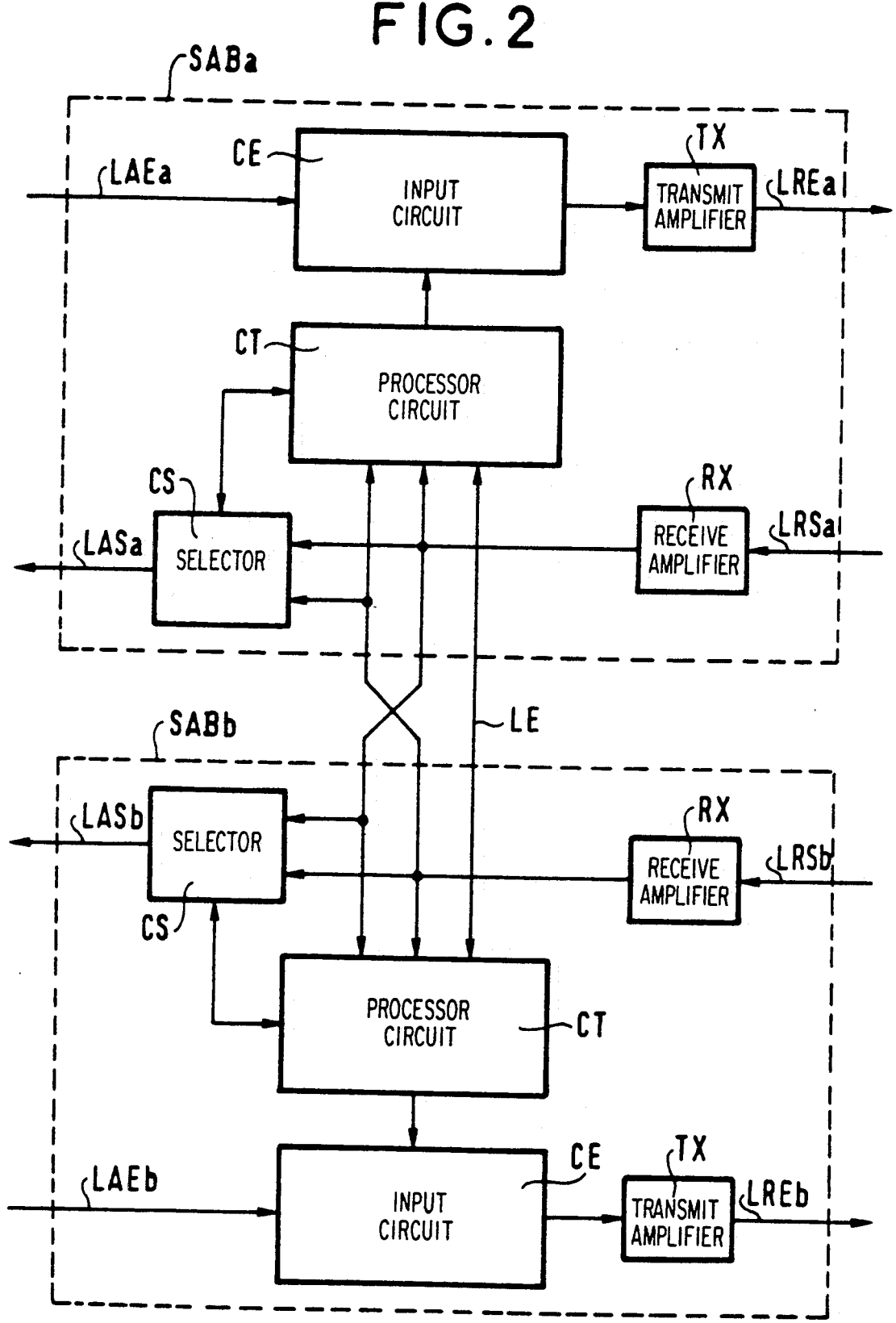
FIG. 2 is a block diagram of a selector circuit shown in FIG. 1.

FIG. 2 shows a selector circuit SAB constituted by two connection circuits SABa and SABb, each connected to the connection unit via an input access link LAEa, LAEb, in order to receive information from the connection unit, and via an output access link LASa, LASb, in order to send information to the connection unit. The access links LAEa and LASa constitute one of the two-way links LAa of FIG. 1, and the access links LAEb and LASb constitute one of the two-way links LAb of FIG. 1.

Each connection circuit is also connected to one of the switching networks via an input network link LREa and an output network link LRSa for circuit SABa, and via an input network link LREb and an output network link LRSb for the circuit SABb. These links are said to be "input" or "output" relative to the switching networks which thus receive information over the input links LREa, LREb, and send information via the output links LRSa and LRSb. The links LREa and LRSa together constitute one of the two-way network links LRa of FIG. 1, and the links LREb and LRSb together constitute one of the twoway network links LRb of FIG. 1.

The links LAEe, LAEb, LASa, LASb, LREa, LREb, LRSa, and LRSb are each constituted, for example, by eight one-way multiplex links having 32 time slots per frame, giving 256 time slots for each transmission direction.

Each connection circuit SABa and SABb comprises an input circuit CE connected to the input access link LAEa or LAEb, a transmit amplifier TX having its input connected to the input circuit CE and having its output connected to the input network link LREa or LREb, a receive amplifier RX having its input connected to an output network link LRSa or LRSb, a selector CS having one input connected to the output from the receive circuit RX in the connection circuit in which it is located and having another input connected to the output from the receive circuit in the other connection circuit, and having an output connected to an output access link LSAa or LSAb, and a processor circuit CT having one input connected to the output of the receive circuit in the connection circuit of which it forms a part and having another input connected to the output of the receive circuit of the other connection circuit, and having an output connected to a control input of the selector CS. The processor circuit CT is also connected to a control input of the input circuit CE.

The two input access links LAEa and LAEb are connected to the output of a connection unit UR (FIG. 1), similarly the two output access links LASa and LASb are connected to an input of said connection unit.

Figure 3:
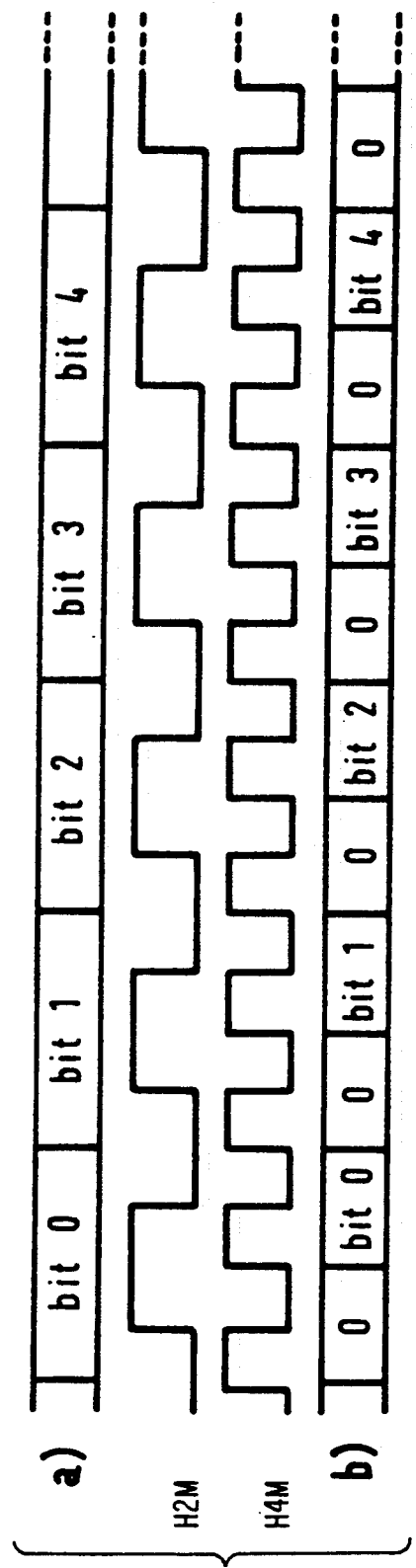
FIG. 3 is a timing diagram relating to time slots transmitted by a connection unit.

In the connection unit, prior to transmission over the input links LAEa and LAEb, data at 64 Kbit/s and a clock signal at 2 Mbit/s are applied to inputs of an AND gate. The resulting logic signal delivered by the AND gate is gated with a 4 Mbit/s clock signal. This is illustrated by the timing diagram of FIG. 3, in which curve a) relates to data bits in a frame having 32 8-bit time slots, the curve H2M is a clock signal at 2 Mbit/s, the curve H4M is a clock signal at 4 Mbit/s, and the curve b) is the result of gating by means of the signal H4M, and it will be observed that the bits 0, 1, 2, 3, . . . , 7 of the curve b) have a duration which is half that of the corresponding bits in the curve a), with the bits being separated by bits of value 0. These bits of value 0 are the additional bits and they are numbered 8 to 15. Data is thus transmitted at 4 Mbit/s over the two links LAEa and LAEb with bits interleaved as follows: 0, 8, 1, 9, 2, 10, 3, 11, 4, 12, 5, 13, 6, 14, 7, 15.

Figure 4:
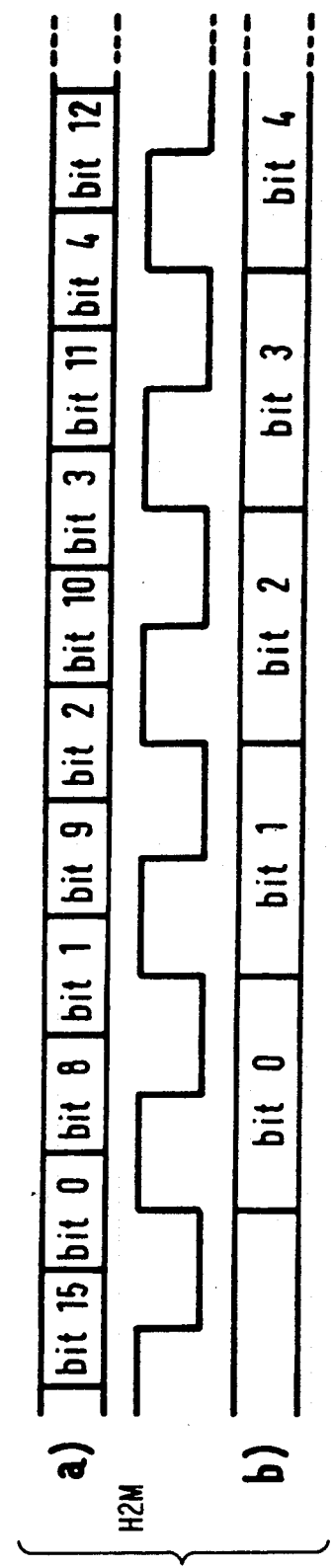
FIG. 4 is a timing diagram relating to time slots received by a connection unit.

On reception, the data at 4 Mbit/s present on the output access links LASa and LASb is gated by a clock signal at 4 Mbit/s. This is illustrated by the timing chart of FIG. 4 in which curve a) relates to the bit of a frame having 32 16-bit time slots, the curve H2M is a clock signal at 2 Mbit/s, and the curve b) is the result of gating using the signal H2M. Thus, the curve b) reproduces the 8 data bits 0 to 7 without any of the additional bits.

The 16 bits are numbered 0 through 15, and they are used as follows:

bits 0 to 7, constitute data bits DO to D7 used by the 16 Kbit/s channel, and they are switched transparently;

bits 8 to 12, these 5 additional bits referenced XO to X4 are switched transparently; and bits 13, 14, and 15, these 3 additional bits are check bits used for protecting and monitoring the switching networks RCXa and RCXb; where bit 13 referenced SYN serves to enable bits 14 and 15 to be interpreted in two different ways depending on whether its own value is 0 or 1:

when SYN=0, operation is said to be in normal mode; and when SYN=1, operation is in message mode, for performing monitoring on request.

Operation in normal mode or in message mode is activated by the control interface IC in each switching network RCXa or RCXb. Normal mode is activated on all 256 time slots processed by a given connection circuit, whereas message mode is activated, on the request of a marker MQ, only for a given one of the 256 time slots processed by a connection circuit. Naturally, message mode may be activated for a plurality of connection circuits by means of the control interface IC.

Figure 5:
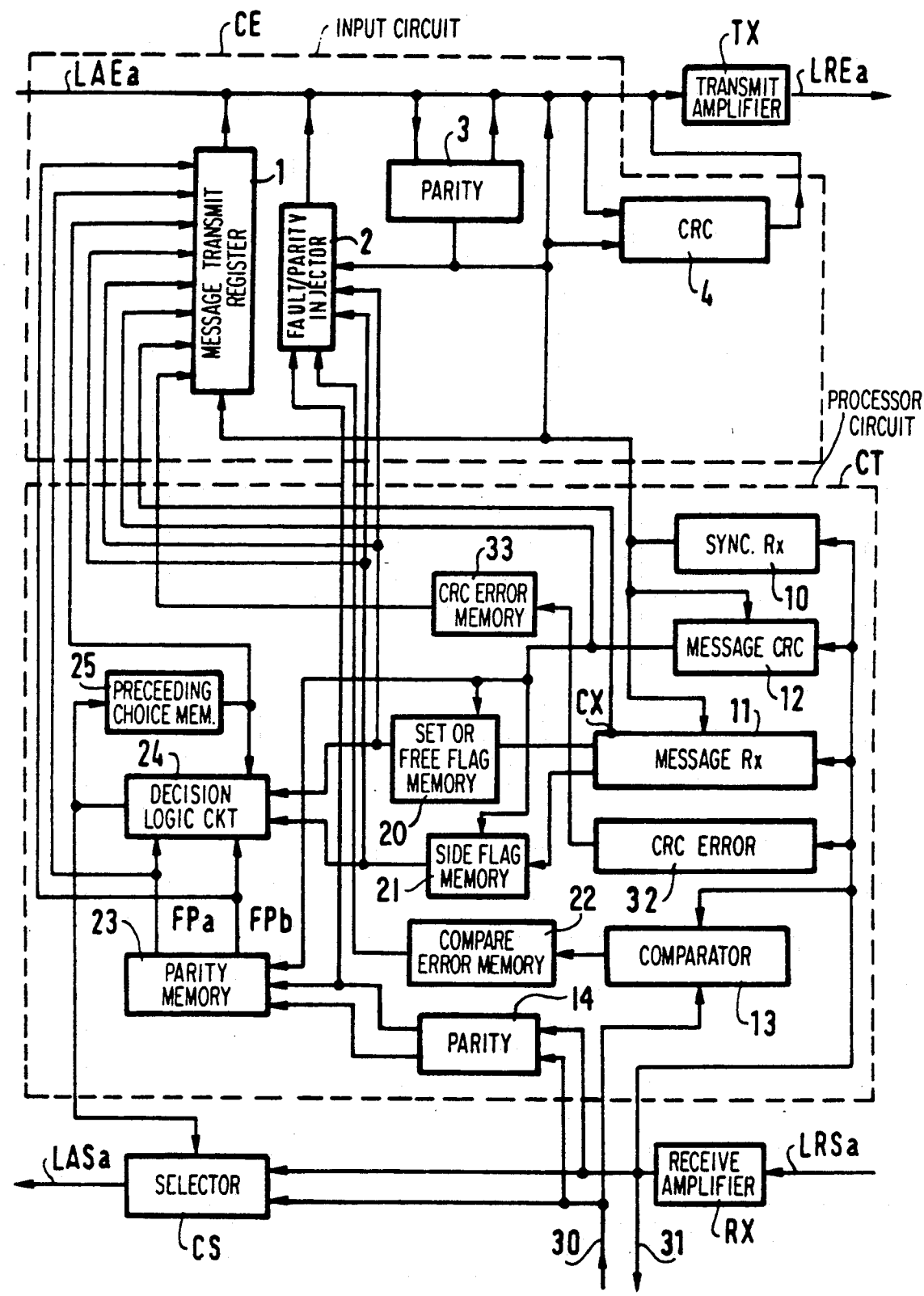
FIG. 5 is a block diagram of a connection circuit shown in FIG. 2.

FIG. 5 shows the input circuit CE and the processor circuit CT of a connection circuit, e.g. SABa as shown in FIG. 2.

The input circuit comprises a message transmit register 1 of the parallel/serial type, with its serial output being connected to the input access link LAEa in order to inject a message therein, a comparison or parity fault injection circuit 2 having its output connected to the input access link LAEa, a parity calculating circuit 3 having its input and its output connected to the input access link, and a calculating circuit 4 for calculating a cyclic redundancy check number having both its input and its output connected to the input access link.

The processor circuit comprises a synchronization signal detector circuit 10, a message reception circuit 11, a verification circuit 12 for performing a cyclic redundancy check on a message, a comparator 13, a CRC error circuit 32 for cyclic redundancy check errors, and a parity calculation circuit 14, with all of these circuits having their respective inputs connected to the output of the receive amplifier RX. The processor circuit also includes a first memory location 20 for a set or free flag and a second memory location 21 for a aside or a b-side flag, a memory location 22 for a compare error, a parity memory 23, a decision logic circuit 24, a preceding choice memory location 25, and a memory location 33 for cyclic redundancy check errors.

The synchronization detection circuit 10 monitors the bit 13 of the output network link LRSa and delivers a signal SYN to the message transmit register 1, to the comparison or parity injection circuit 2, to the parity calculation circuit 3, to the cyclic redundancy check calculating circuit 4, and to the input access link LAEa. When the signal SYN has the value 0, it activates the parity calculation circuit 3 and the comparison or parity fault injection circuit 2. When the signal SYN has the value 1, it activates the message transmit register 1, in order to transmit the message contained in the register, and it activates the calculation circuit 4 for calculating the cyclic redundancy check on the bits 0 to 15 of the time slots in a multiframe of the link LREa conveying the message.

The synchronization detection circuit 10 also controls the verification circuit 12 and the message reception circuit 11 when the signal SYN is at value 1. The message reception circuit 11 receives a 1-bit forced or free flag in a control field and it delivers a signal of value 1 to the first memory location 20 for a free flag and the value 0 for a forced flag. The message reception circuit also receives an a-side or b-side flag bit in the control field and it delivers a corresponding signal to the second memory location 21. Memory locations 20 and 21 are enabled by the verification circuit 12 when the cyclic redundancy check performed thereby is satisfactory.

The memory location 33 is connected to the output of the circuit 32 for indicating a CRC error, and serves to store the fact that a CRC error has occurred.

The comparator 13 has an input connected to a multiplex link 30 coming from the receive amplifier output of the other connection circuit SABb. The comparator 13 performs a timeslot-by-timeslot comparison between the time slots delivered by the receive amplifier of connection circuit SABa and the time slots delivered by the receive amplifier of connection circuit SABb. In the event of an error, the comparator delivers a comparison error signal to memory location 22. The parity calculation circuit 14 calculates the parity of each time slot delivered the receive amplifier. The result of this calculation is stored in the parity memory 23. The parity calculation circuit 14 is also connected to the multiplex link 30 and the result of the parity calculation performed on a time slot delivered by the receive amplifier of connection circuit SABb is delivered to the parity memory 23. The parity memory includes one memory location per time slot for the output network link LRSa and one memory location per time slot for the output network LRSb. The decision logic 24 is connected to the output of the parity memory and, for each channel, it receives a signal FPa or FPb representing the results of reading the two memory locations corresponding to that time slot, one in the link LRSa and the other in the link LRSb. In message mode, after reading the memory location corresponding to the time slot in the link LRSa which is conveying the message, this memory location is reinitialized so long as the verification performed by the verification circuit 12 is correct. The decision logic circuit 24 is also connected to the outputs of the first and second memory locations 20 and 21, and to the output of the preceding choice memory 25. The output from the decision logic circuit is connected to a control input of the selector CS and to the input of the preceding choice memory 25.

The message transmit register 1 has inputs connected to the output from the parity memory 23 from which it receives the result FPa of reading the memory location attributed to the time slot in the link LRSa conveying a message, and the result FPb of reading the memory location attributed to the time slot in the link LRSb conveying the message, to the output of the preceding choice memory, to the outputs of the first and second memory locations 20 and 21, to the output of memory location 33, to the output of the verification circuit 12, and to an output CX of the message reception circuit 11 which delivers a connection field contained in the message on said output CX.

The comparison or parity fault injection circuit 2 has its inputs connected to the output from the parity calculation circuit 14 and to the output from the comparison fault memory location 22. It is also connected to the outputs of the first and second memory locations 20 and 21.

Normal mode operation with bit 13, SYN, equal to 0, serves to detect parity errors on the input network links LREa and LREb, and on the output network links LRSa and LRSb, and to transmit errors via bit 14 to each of the switching networks RCXa and RCXb. These errors may be comparison errors between corresponding time slots on the links LRSa and LRSb as detected by the processor circuit CT, or the result of parity calculations performed on the input network link LRSa or LRSb by the processor circuit. The bit 15, referenced PAR for parity, is such that the number of 1-value bits calculated over the bits 0 to 5 transmitted on the input link LREa or LREb is even.

In message mode operation, bit 13, SYN, is equal to 1, as activated by the control interface IC of a switching network on request of the marker MQ.

Message mode may be applied to only one of the 256 time slots of a network link comprising 8 multiplexes of 32 time slots each. Bit 14 conveys the message and bit 15 gives the result of a cyclic redundancy check calculated on the bits 0 to 14 of the time slots concerned and relating to a message. In this mode of operation, a switching network transmits a message to a connection circuit of a connection unit, and the said connection circuit transmits a message to the said switching network.

In both modes of operation, bit comparison of a time slot in the output network links LRSa and LRSb applies only to bits 0 through 12 since the bits 13, 14, and 15 may differ between the output links, as happens during message mode. The decision logic circuit of the processor circuit CT chooses between the two corresponding time slots of the output network links LRSa and LRSb in order to determine which one of them is to be transmitted over the output access link: LASa for connection circuit SABa and LASb for connection circuit SABb. The selection criteria applied by the decision logic circuit are as follows:

FPa=1 parity fault detected on LRSa, for each time slot.

FPb=1 parity fault detected on LRSb, for each time slot.

PI: PI=1 for free flag or PI=0 to flag choice forced by the switching network. Regardless of whether this flag is 0 or 1, it applies to all 512 time slots processed by the connection circuit. It is stored in a memory location of the processor circuit.

P: P=a for forced side LRSa, or P=b for forced side LRSb, for the entire set of 512 time slots.

Cp: preceding choice: a for side LRSa, or b for side LRSb, for each time slot.

In the processor circuit CT, the parity faults FPa and FPb of each time slot are stored in the parity fault memory 23. Each parity fault is stored in a memory location of the parity fault memory. There are therefore two memory locations per time slot, i.e. twice 256 memory locations for the 256 time slots of the output network links LRSa and LRSb. The free or forced flag PI is stored in the processor circuit in the flag memory location 20. Similarly the a-side or b-side flag is stored in the side flag memory location 21. The preceding choice is stored in the preceding choice memory 25 of the processor circuit. Said preceding choice memory therefore includes a memory location for the 256 time slots.

The truth table of the decision logic circuit is given below, where Cc is the result of the selection as a function of the selection criteria:

| PI | P | FPa | FPb | Cc |
|----|---|-----|-----|-----|
| 0  | a | X   | X   | a  |
| 0  | b | X   | X   | b  |
| 1  | X | 0   | 0   | Cp |
| 1  | X | 1   | 0   | b  |
| 1  | X | 0   | 1   | a  |
| 1  | X | 1   | 1   | Cp |

The general initialization of the preceding choice memory 25 is performed by forcing side LRSa or LRSb. The decision logic circuit 24 delivers a control signal Cc to the selector CS to connect the output access link to the selected output network link.

NORMAL OPERATION, bit 13, SYN = 0

Reference is made below to connection circuit SABa, but naturally everything that is said is equally applicable to connection circuit SABb. All that needs to be done is change suffix a to suffix b in the references and vice versa, e.g. change LRSa to LRSb. For each time slot, the processor circuit CT performs a bit-by-bit comparison between the information received over the output network links LRSa and LRSb and transmits the results to the input circuit CE. The processor circuit CT checks the parity of each time slot received over the output network link LRSa, and in the event of an error it activates the parity fault memory location corresponding to the time slot in question. The decision logic circuit provides the selected network link for which the information is transmitted, for the time slot under consideration, over the output access link LASa.

Depending on the state of the free or forced flag memory location 20, and on the state of the side flag memory location 21, the input circuit CE transmits in bit 14 of the input network link LREa: the result of the comparison if the setting is free or forced to the side of network link LRSb.

The input circuit CE calculates parity on bits 0 through 14 on the input network link LREa and the result "PAR" is transmitted in bit 15.

OPERATION IN MESSAGE MODE, bit 13, SYN = 1

It is recalled that in message mode, bit 13 has the value 1 for only 1 out of the 256 time slots processed by the connection circuit.

In this mode of operation, bit 13 provides multiframe synchronization, i.e. a sequence of 32 bits, 31 of which have the value 1 with the last bit having the value 0. This multiframe synchronization structure makes it possible to synchronize the process of monitoring on request over disturbed links in the context of long duration monitoring.

Bit 14 gives a sequence of 32 bits constituted by a first field of 24 bits conveying the switching reference and a second field of 8 bits conveying, over an output network link, instructions transmitted by a switching network to a connection circuit, or information transmitted over an output network link or a connection circuit to a switching network.

The instructions transmitted by a switching network relate to the forced or free positioning of the connection circuit on one or other of the output links LRSa and LRSb. The information transmitted by a connection circuit comprises firstly the result of verifications performed by the said connection circuit, and secondly its current selection state, i.e. which one of the links LRSa and LRSb is currently selected by the decision logic circuit.

In message mode, the bit 15 gives a sequence of 32 bits constituted by the result of the cyclic redundancy check calculation on a multiframe, occupying 16 bits per frame, i.e. in total of a block of 512 bits. The calculation is performed during one multiframe and the result is transmitted during the following multiframe, bit-by-bit. The cyclic redundancy check is a standard polynomial of degree 32.

In this description of message mode, reference is made to connection circuit SABa, but naturally everything that is said is equally applicable to connection circuit SABb. To see this, it is necessary merely to change references a to b and vice versa, e.g.: LRSa to LRSb.

The connection circuit SABa switches over to message mode operation as soon as a transition is detected in bit 13, SYN, from 0 to 1, in a time slot of an output network link LRSa. The frames received by the processor circuit CT are numbered modulo 32 from this instant. The processor circuit proceeds to perform a cyclic redundancy check on bit 15 of the time slot concerned in frames 0 through 31 on link LRSa, and if the verification is correct, the processor circuit memorizes the settings of PI (PI=1 for free selection, PI=0 for forced selection), and of P (P=a for forcing to side LRSa, and P=b for selection forced to side LSRb). These settings of PI and P are received by the link LRSa in the control field of the received message starting from the 0 to 1 transition in bit 13.

The processor circuit also verifies the parity of the time slots on the output network link LRSa, and the result is stored in the memory locations of the parity fault memory and is transmitted to the other connection circuit SABb.

The processor circuit CT transmits the following to the input circuit CE for transmission in the information field of the message transmitted over the input link LREa by the bit 14:
- the result of the cyclic redundancy check verification on the output network link LRSa;
- the result of reading the flag memories, i.e. whether selection is free or forced to side a or b, and the preceding selection memory location for the time slot concerned by the message;
- the result of reading the parity fault memory location associated with the time slot concerned over the output network link LRSa; and
- the switching reference received over the output link LRSa, which switching reference is contained in the received message and its transfer to the input network link LREa takes place bit-by-bit in real time.

The input circuit CE performs a cyclic redundancy check calculation on the input network link LREa over a multiframe of 32 16-bit frames, i.e. in all, over a block of 512 bits. The calculation is performed during one multiframe and the result which constitutes a sequence of 32 bits is sent, bit-by-bit, in the following multiframe in bit 15 of the time slot concerned by the transmitted message.

The information transmitted over the input network links LREa and LREb of the connection circuits SABa and SABb is received in each of the corresponding switching networks by the input/output interface ILR. In operation in normal mode, bit 14 is monitored permanently and comparison faults are stored. Bit 14 contains comparison faults with free or forced selection. The comparison faults are accessible by the control interface IC of the switching network. In message mode operation, bits 0 through 12 are transmitted transparently by the input/output interface ILR, from the input network link LRE to the switching matrix MCX, and from the switching matrix to the output network links LRS. A message intended for a connection unit UR is injected by the input/output interface on the corresponding output network link LRS, and the message transmitted in reply by the connection unit reaches the input/output interface over the corresponding input network line LRE.

We claim:

1. An interconnection system for interconnecting connection units and a central switching facility, said central switching facility being duplicated and constituted by two switching networks, each connection unit being connected to both switching networks via a selection circuit comprising two connection circuits, each connection circuit being connected by an access link to the connection unit and by a network link to one of the switching networks, said network and access links being two-way multiplex links having frames of fixed length; wherein each connection circuits has two operation modes: a normal operation mode and a message operation mode, the latter consisting in receiving messages from the switching networks and sending messages to the switching networks; each mode being activated by frames sent form the switching networks to the connection circuits, each frame comprising 16-bit time slots providing: 8 data bits, 5 transparent bits, and 3 check bits; a first one of the check bits being a connection circuit operation mode bit having a value 0 for a normal operation mode and a value 1 for message operation mode; the value of the first check bit being fixed by the switching network in each time slot that it transmits towards the connection circuit;
and wherein each message comprises a multiframe of order thirty-two, said first check bit having the value 1 for only one time slot out of the time slots transmitted by the switching network to the connection circuit, and likewise for one time slot out of the time slots delivered by the connection circuit to the switching network, the value 1 being maintained for thirty-one frames and replaced by the value 0 during the thirty-second frame of a multiframe; said message being conveyed by the second check bit; and the third check bit conveying a cyclic redundancy check of order thirty-two, calculated over all of the bits conveyed by the frames of the multiframe.

2. An interconnection system according to claim 1, wherein in normal operation mode:
the first and second check bits in each of the time slots transmitted by the switching network tot eh connection circuit have the value 0, and the third check bit has a value such that the number of value 1 bits calculated over the sixteen bits of the time slot is even;
in each time slot delivered by the connection circuit to the switching network:
the first check bit has the value 0;
the second check bit gives:
the result of a comparison, bit by bit, of information on the two network links, performed by processor means if decision means receive a flag indicating either a free selection or an imposed selection of the switching network to which said processor means are connected;
the result of a parity calculation, performed by said processor means, on information coming from the switching network by the network link, if decision means receive a flag indicating an imposed selection of the switching network to which said processor means are connected;
and the third check bit has a value such that the number of value 1 bits calculated over the sixteen bits of the delivered time slot is even.

3. An interconnection circuit according to claim 1, wherein, in message operation mode:
for sending a first message from the switching network to the connection circuit:
the first check bit in the time slot transmitted by the switching network to the connection circuit has the value 1;
the second check bit is one bit of said first message, said first message comprising a control field and a switching reference field designating one time slot selected from the time slots delivered by the connection circuit to the switching network;

the third check bit corresponds to the result of cyclic redundancy check performed by the switching network on the sixteen bits of the time slots of a preceding multiframe transmitted to the connection circuit;

and, for sending a second message from said connection circuit to said switching network, in a time slot designated by said switching reference field:

the first check bit has the value 1;

the second check bit corresponds to one bit of the second message, said second message comprising an information field and a switching reference field identical to that contained in the first message transmitted by the switching network;

and the third check bit corresponds to the result of a cyclic redundancy check performed by said connection circuit on the sixteen bits of the time slot of a preceding multiframe transmitted to the switching network.

* * * * *